United States Patent [19]
Niwa et al.

[11] Patent Number: 4,502,770
[45] Date of Patent: Mar. 5, 1985

[54] MOTOR DRIVE CIRCUIT FOR STILL CAMERA

[75] Inventors: Katsuhisa Niwa; Takahiro Ikeda, both of Osaka, Japan

[73] Assignee: West Electric Company, Ltd., Osaka, Japan

[21] Appl. No.: 549,730

[22] Filed: Nov. 8, 1983

[30] Foreign Application Priority Data

Nov. 10, 1982 [JP] Japan .................. 57-197022

[51] Int. Cl.³ .......................... G03B 1/00; G03B 17/36
[52] U.S. Cl. ............................. 354/173.11; 354/213; 354/214; 354/217
[58] Field of Search ............... 354/171, 173.1, 173.11, 354/206, 213, 214, 215, 217, 218

[56] References Cited

U.S. PATENT DOCUMENTS 4,440,481 4/1984 Hoda et al. ................ 354/214 X
4,460,256 7/1984 Araki et al. ................ 354/173.11

Primary Examiner—William B. Perkey
Attorney, Agent, or Firm—Cushman, Darby & Cushman

[57] ABSTRACT

Controlling of film winding-up and film rewinding are carried out responding to an insertion of film, open and close of the back lid of the camera and moving of the film; and the motor is stopped when the status of the camera operation is abnormal, such as film is not filled or film is caught or the back lid is not completely closed; and when the film is set and back lid is closed, the film is automatically wound up to the position of the first frame photographing by a half-pushing of a shutter release button, thereby eliminating necessity of the film frame number counter or the like; by quick stopping of the motor at abnormal states, waste of power source current due to motor over current is eliminated.

3 Claims, 3 Drawing Figures

MOTOR DRIVE CIRCUIT FOR STILL CAMERA

BACKGROUND OF THE INVENTION

1. Field of the Invention

The present invention relates to an improvement of a motor drive circuit for a still camera wherein a film winding and rewinding are made by motor.

2. Description of the Prior Art

In the conventional still camera, which has a means to wind and rewind film automatically by electric motor, after finishing a normal photographing triggered by pushing a release button the film is automatically wound up, and when the last frame of the film has been photographed, then the film is automatically rewound, thereby the camera operation is simplified.

However, operation from the installation of a film into the camera and subsequent winding-up of the film up to a first photographing frame position has been made by manually pushing the release button by the photographer watching the film frame number counter, and therefore there is some need of being accustomed to the camera, and when the photographing of a designed number of frames is over, and the film comes to the end the film stops to be pulled out, thereby causing an overloading of the motor, whereby the camera detects the end of the film through the overcurrent of the motor. Such kind of the circuit necessarily requires an overcurrent, and such overcurrent for a several second is a waste of power source current. Another conventional mechanical system to mechanically stop the motor winding-up requires a complicated mechanical system and has a problem of liability of trouble due to complicated mechanism and a fairly large space for containing the system.

SUMMARY OF THE INVENTION

Purpose of the present invention is to provide a motor drive circuit for a still camera wherein the conventional problem is dissolved, less mechanical system is used in film winding-up and rewinding and the motor controls are made by electric circuits responding to various states of the camera, thereby improving operability of the camera.

The motor drive circuit for a still camera in accordance with the present invention comprises:

a motor which can be driven in rotational directions, a motor drive part for causing the motor to rotate, a mode control part for controlling the motor, which provides a first operation mode for making the motor to wind-up to transfer a film to a position for a first frame photographing after putting a film magazine into the still camera, a second operation mode for making the motor to wind-up the film after each photographing and a third operation mode for rewinding all the film after completion of photographing of all frames, a state detection part for detecting states of filling of the film magazine in the still camera and complete closing of a back lid of the still camera, a film running detection switch for detecting normal running of film, and a mode time discriminator for setting a predetermined time responding to output signals of the state detection part and occurrence of either one of the first operation mode, the second operation mode or the third operation mode, whereby the motor is controlled in such a manner that, in case the state detection part detects that film magazine is not yet put in the right position of the camera or that the back lid is not completely closed, the motor is stopped after a lapse of the predetermined short time, in case one of the operation modes is selected by the mode control part, responding to result of operation of signal of the predetermined time and signal of the film running detection switch, the motor driving is controlled.

DETAILED DESCRIPTION OF THE PRESENT INVENTION

In order to achieve the above-mentioned purpose the motor drive circuit for a still camera of the present invention has the following parts:

A state detection part for detecting putting a film magazine in camera and complete closing of the back lid of the camera, motor driving part for film winding and rewinding, initial wind-up actuation circuit for winding-up the film from initial position to a first frame photographing position by half-pushing of a shutter release button, a film counter for counting the number of film frame presenting at the photographing position, a count pulse signal generator circuit which, responding to a signal of motor driving, output signals of the state detection part and of a film running detection switch give count pulse signal to the film counter, a motor driving mode selection means which responding to output signals of the state detection part, counts pulse signal from the count pulse signal generator circuit and the motor driving signal selects mode of the motor driving and a film transfer direction circuit which selects direction of film running responding to the output signal of the motor driving mode selection means. Details of the above-mentioned circuits are described hereafter.

Figure 1:
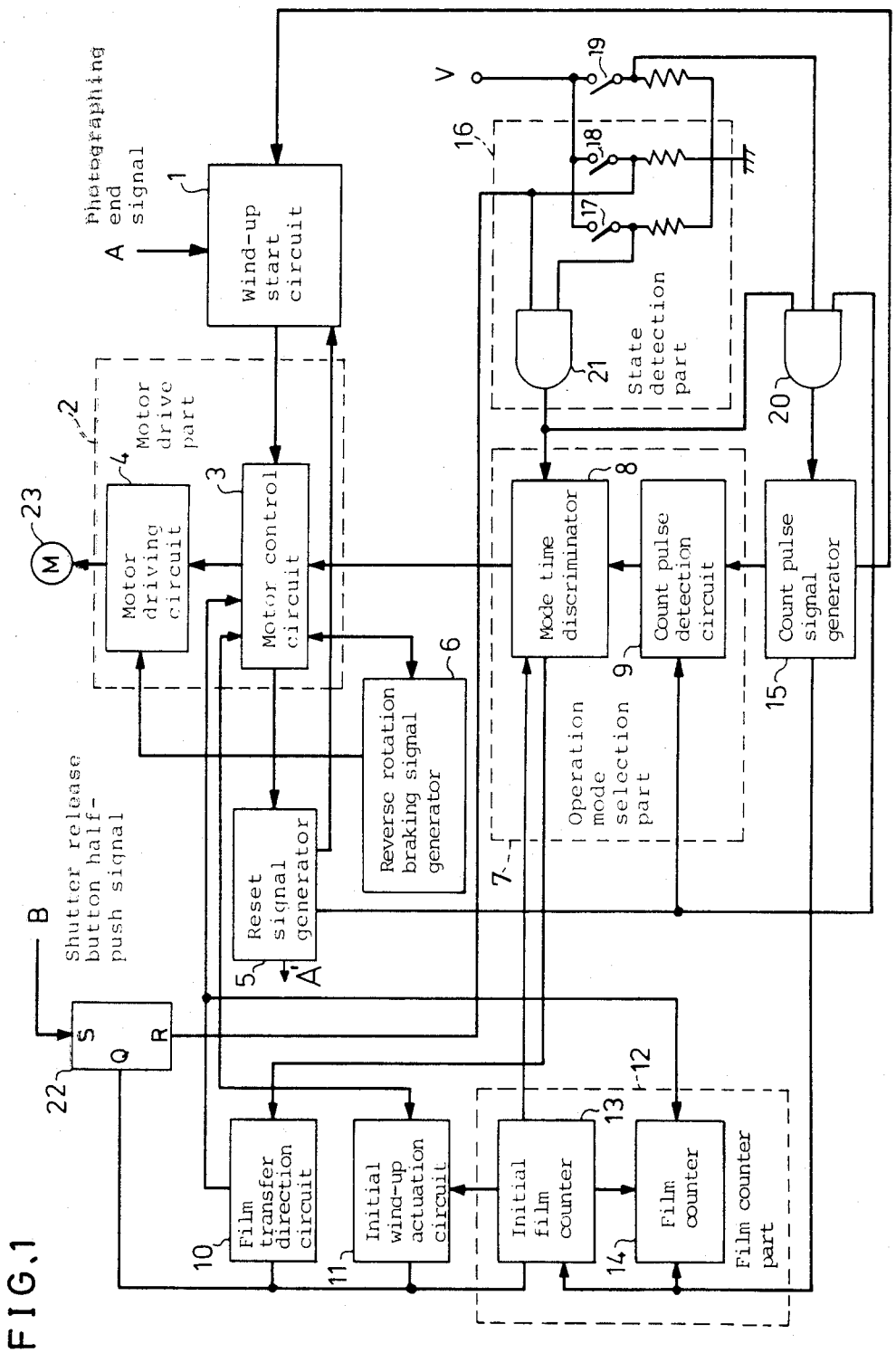
FIG. 1 is a circuit diagram of the motor drive circuit for a still camera embodying the present invention.

FIG. 1 shows a circuit diagram of one example embodying the present invention. Hereinafter, the operation of the circuit is elucidated with respect to its various modes of motor drive operations.

[1] When film magazine is not filled or the back lid is open:

When a photographer intend to take a photograph by a full pushing down of a shutter release button thereby making a shutter motion, a photographing end signal A is impressed on a wind-up start circuit 1, then the wind-up start circuit 1 operates and a film wind-up signal is given to a motor control circuit 3 which is in the motor drive part 2, thereby a motor driving circuit 4 is actuated by the output signal from the motor control circuit 3. Accordingly, the motor 23 is rotated in a direction to wind-up the film.

Hereupon, it is natural that when the film magazine is not filled in the camera or the back lid is not completely closed, namely in abnormal state, even when the shutter release button is fully pushed down and the motor starts to rotate, the motor rotation time is preferably short in order to avoid undesirable waste of power source current. In case the film magazine is not yet put in and the back lid is not completely closed, there are cases that film magazine detection switch 17 in the state detection part 16 and the back lid detection switch 18 are both off state, or either one of the switch 17 and 18 is off, and then the states of the switches 17 and 18 are given to an AND gate 21. The output signal of the AND gate 21 is given to a mode time discriminator 8 in a operation mode selection part 7.

On the other hand, by operation of the motor control circuit 3, a wind-up drive signal is also given a reset signal generator 5 to drive it, and by the output signal of the reset signal generator 5 a count pulse detection circuit 9 is actuated. The count pulse detection circuit 9 is for detecting existence of count pulse signal from the count pulse signal generator 15 which is a circuit for generating count pulse signal responding to running of film. Since there is no film is put in the camera, no film running is made, and thereby output signal of the count pulse detection circuit 9 is impressed on the mode time discrimination circuit 8. Then the mode time discriminator 8 determines motor drive time responding to both the output signal of the AND gate 21 and output signal of the count pulse detection circuit 9, and issues discrimination signal to the motor control circuit 3 in the motor drive part 2.

Accordingly, when the film magazine is not inserted or when the back lid is not completely closed, by means of the motor time discriminator 8 the driving time of the motor winding is limited to a shortest time, thereby limiting the motor rotation in a very short time. By the time discrimination by the mode time discriminator 8, a wind-up drive signal from the wind-up start circuit 1 is interrupted, the motor 23 ceases to receive the wind-up drive power, thereby the motor 23 stops.

When the wind-up drive signal ceases, a reverse rotation braking signal generator 6 is actuated, and therefore, a motor drive signal to reverse the rotation of the motor 23 is generated. And this signal is impressed on the motor driving circuit 4 for a predetermined time, thereby impressing the motor 23 with a braking signal, to stops the motor 23 in a very short time.

During the time that the reverse drive signal is impressed on the motor 23 to brake it, the reset signal generator 5 receives reversing braking signal through the reversing braking signal circuit 6 and the motor control circuit 3 instead of hitherto impressed winding-up driving signal. When the reversing braking signal ceases, the reset signal generator 5 issues a reset signal, to reset the count pulse detection circuit 9. On the other hand, the reset signal is impressed on the wind-up start circuit 1 also, to reset it.

[2] Film winding-up immediately after complete closing of back lid:

The mode of this operation is to wind-up a predetermined length of initial end part of film which has been exposed to light, before first photographing, by the film winding means namely spool, thereby enabling a first photographing on an exposed part of the film.

Figure 2:
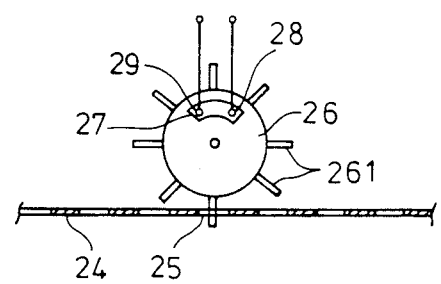
FIG. 2 is a partially fragmental plan view of a switch mechanism for film running detection switch.

When the detection switch 18 is turned on by completely closing the back lid of the camera, a reset state of a S-R flip-flop 22 is released. In this state, when a shutter release button half-push signal B is given to the S terminal of the S-R flip-flop 22 by the operation of the shutter release button, its Q terminal output is reversed and the reversed signal is given to a film transfer direction circuit 10, an initial wind-up actuation circuit 11 and initial film counter 13 to actuate them. The initial film counter 13 is provided in a film counter part 12 which is for counting length of transfer of the film. When the initial wind-up actuation circuit 11 is actuated, a wind-up actuation signal is issued therefrom, and given to the motor control circuit 3, thereby making the motor 23 to rotate in a direction to wind-up the film. As the film is wound-up by the rotation of the motor 23, running detection switch 19 issues periodical ON signals. The running detection switch 19 is configured as shown in FIG. 2 where a pinion 20 having eight protrusions 261 around it rotates along the running of the film by engagement of the protrusions 261 with the perforations. And transfer of the film for pitch of eight perforations, the fixed contacts 28 and 29 are closed by a moving contact 27 provided on the pinion 26.

When the running detection switch 19 is turned on, H-level signal is input to the AND gate 20, which at reception of H-level signal from the AND gate 21 issues H-level signal to a count pulse signal generator 15, which issues film count pulse every time when the running detection switch 19 turns on. The counter signal is then input to the initial film counter 13 which is in the actuated state and counted therein. Accordingly, the initial film counter 13 issues an initial wind-up completion signal when a length of predetermined number of frame of the film is transferred to enable safe fast photographing, for instance, a length of 2 frames namely the length of 16 perforations is transferred. This initial wind-up completion signal is then input on the initial wind-up actuation circuit 11, which thereafter causes to stop wind-up drive signal, which has been hitherto given to motor control circuit 3, thereby stopping the motor 23. The wind-up completion signal issued from the initial film counter 13 is also given to a film counter 14 so as to change the film counter 14 to actuated state, and simultaneously the counted number is displayed in a known numerical display in a manner, frame S or frame 1 or frame 2 . . . .

The initial wind-up completion signal is further given to the film transfer direction circuit 10, which thereafter changes its state to control the motor drive part 2 to carry out film running in a direction necessary subsequent normal photographing after the first photographing.

The above-mentioned operation is the operation of initial winding-up of the film. In such operation if the film is not rightly put in the camera, causing a failure of film running as the motor rotates, then the count pulse signal generator 15 does not issue the count pulse to the count pulse detector 9 in a predetermined time, and this indicates that the film fails to be normally wound-up in such case, and the count pulse detection circuit 9 issues output to the mode time discriminator 8 to cause the latter issues a signal to the motor control circuit 3 to cause it to stop the motor 23.

[3] Operation of windings after one frame photographings:

After the above-mentioned first wind-up operation of the film to the position of the first frame for photographing, the frame must be wound-up to the next frame position after each photographing. This is made by that, when the shutter button is further fully pressed down from the aforementioned half-pushed position, the shutter operates for an exposure, then by a known system, a photograph finish signal A is given to the wind-up start circuit 1 which issues an output signal to the motor control circuit 3, thereby to actuate the motor 23 to wind-up the film. As the film runs, the aforementioned running detection switch 19 issues one running detection signal, which is given to the count pulse signal generator 15 through the AND gate 20. Then the output of the count pulse signal generator 15 is impressed to the film counter 14 which count the number of the photographed frame of the film. The output of the count pulse signal generator 15 is also impressed on the wind-up start circuit 1, which causes the motor control circuit 3 to stop its motor driving signal. At the same time the motor control circuit 3 makes the reverse rotation braking signal generator 6 to issue the reverse rotation braking signal to the motor driving circuit 4, thereby the motor 23 is immediately stopped. Thereafter, a photograph finish signal generator A' (not shown) is reset at a reception of the reset signal from the reset signal generator 5, and the photograph finish signal A is stopped, and the whole circuit prepares the next photographing.

[4] Film rewinding operation:

After the above-mentioned normal photographing and subsequent wind-up by one frame are repeated and the final frame has been photographed, then when the wind-up start circuit 1 issues its signal and the motor 23 starts to a rotation, but the film becomes not to be wound-up since the end of the film is fixed in the film magazine. Then the running detection switch 19 does not issue the output, and accordingly the count pulse signal generator 15 does not issue its count pulse signal. On the other hand, the count pulse detection circuit 9 does not issue its output signal to the mode time discriminator 8 within a predetermined time, causing the mode time discriminator 8 to issue a rewind drive signal to the film transfer direction circuit 10, which changes its output at reception of the signal from the mode time discriminator 8 and causes the motor control circuit 3 to reverse the direction of the rotation of the motor 23.

When the direction of the rotation of the motor 23 is reversed, the film end which is fixed through the film magazine is rewound into the film magazine.

During the rewinding operation, the running detection switch 19 detects running of the film and makes the count pulse signal generator 15 issue a reset pulse to the wind-up start circuit 1, thereby to cease the wind-up drive signal to the motor control circuit 3. On the other hand, by receiving a rewind drive signal from the film transfer direction circuit 10, the film counter 14 is switched from hitherto up-counter operation to thereafter down-counter operation, thereby to count-down the number of the frame of the film to zero.

[5] Finish of film rewinding:

When the film rewind is finished, and whole the film is rewind in the film magazine, the running detection switch 19 stops to issue output signal, and therefore no count pulse signal is issued from the count pulse signal generator 15, and accordingly, neighter the film counter 14 nor the count pulse detection circuit 9 receives count pulse signal. By extinguishing of the count pulse signal to the count pulse detection circuit 9 the latter makes the mode time discriminator 8 to issue a rewind finish signal after a predetermined time to the film transfer direction circuit 10, to stop its output signal namely rewind drive signal, and issue a rewind finish signal to the motor control circuit 3 to stop the motor 23.

The rewind finish signal is reset when the back lid is open. That is, by opening the back lid, the back lid detection switch 18 is opened and issues a reset signal to the S-R flip-flop 22, thereby to make output signal to the film transfer direction circuit 10 to reset it, and also the initial wind-up actuation circuit 11 and initial film counter 13 are simultaneously reset by the output of the S-R flip-flop 22.

Figure 3:
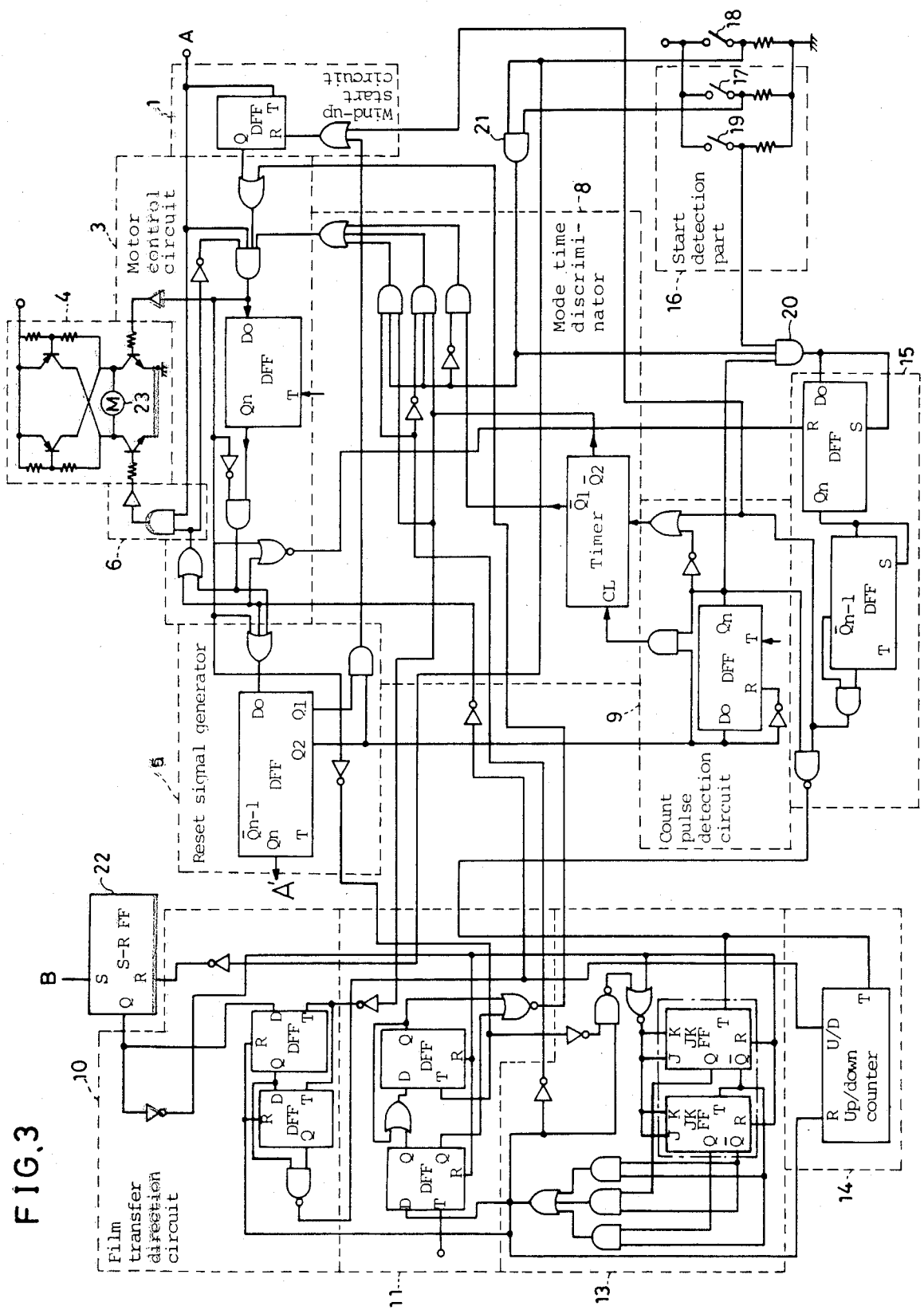
FIG. 3 is an example of a more detailed circuit diagram of the motor drive circuit for a still camera shown in FIG. 1.

FIG. 3 is a more detailed circuit configuration of the circuit of FIG. 1 wherein the film transfer direction circuit 10, initial wind-up actuation circuit 11, initial film counter 13, motor driving circuit 4, motor control circuit 3, reverse rotation braking signal generator 6, mode time discriminator 8, count pulse detection circuit 9, count pulse signal generator 15 are shown by component known logic circuits. As shown in FIG. 3, the film transfer direction circuit comprises two D flip-flops (DFF) and also the initial wound-up actuation circuit comprises two D flip-flops (DFF). The initial film counter has two JK flip-flops (JKFF). The reset signal genarator 5, the motor control circuit 3, the count pulse detection circuit 9 and count pulse signal generator 15 comprises D flip-flops (DFF). The mode time discriminator 8 comprises a timer and other logic gate. Wind-up start circuit 1 also comprises D flip-flop (DFF).

As has been described with reference to the examples shown in FIG. 1 through FIG. 3, the motor drive circuit for still camera in accordance with the present invention can control film winding and rewinding by electric circuit, and such circuit is easily provided on an LSI, and initial film winding immediately after putting in of the film in the camera as a preparation of the first frame photographing is made by simply half pushing down of the shutter release button, and there is no need of watching a film count indicator, and also after the last frame of the film are photographed the end of the film is electrically detected without use of complicated mechanism and therefore fear of mechanical trouble of the film end detection means is eliminated.

What is claimed is:

1. A motor drive circuit for still camera comprising:
    a motor which can be driven in rotational directions,
    a motor drive part for causing said motor to rotate,
    a mode control part for controlling said motor, which provides a first operation mode for making said motor to wind-up to transfer a film to a position for a first frame photographing after putting a film magazine into said still camera, a second operation mode for making said motor to wind-up said film after each photographing and a third operation mode for rewinding all the film after completion of photographing of all frames,
    a state detection part for detecting states of filling of said film magazine in said still camera and complete closing of a back lid of said still camera,
    a film running detection switch for detecting normal running of film, and
    a mode time discriminator for setting a predetermined time responding to output signals of said state detection part and occurrence of either one of said first operation mode, said second operation mode or said third operation mode,
    whereby said motor is controlled in such a manner that,
    in case said state detection part detects that film magazine is not yet put in the right position of the camera or that the back lid is not completely closed the motor is stopped after a lapse of said predetermined short time,
    in case one of said operation modes is selected by said mode control part, responding to result of operation of signal of said predetermined time and signal of said film running detection switch, the motor driving is controlled.

2. A motor drive circuit for still camera in accordance with claim 1, wherein said predetermined time at a case, when in said first operation mode said state detection part detects that film magazine is not yet put in the right position of the camera or that the back lid is not completely closed, is selected to be shorter than the predetermined times of any other two operation modes.

3. A motor drive circuit for still camera comprising:

a reversively rotatable motor, a wind-up start circuit for issuing a wind-up drive signal at reception of every photograph ending signal based on an exposuring motion of a shutter caused by a full pushing of a shutter release button, a motor drive part for actuating said motor to rotate in a direction selected responding to said wind-up drive signal or a rewind drive signal, a state detection part for detecting states of filling of film magazine in said still camera and complete closing of a back lid of said still camera, an initial wind-up actuation circuit for controlling said motor to wind-up a film of said film magazine to a position of a first frame photographing, responding to signal of said state detection part issued by putting said film magazine into said camera and said complete closing of said back lid and a half-pushing of said release button, a film counter for counting number of frames of film transfer, a film running detector for detecting running of said film, a count pulse signal generator for generating count pulse signal at reception of output signal from said state detection part and film running detector, to issue said count pulse signal only when said states of filling of film magazine in said still camera and complete closing of back lid of said still camera are detected by said state detection part, and also running of said film is detected by said film running detector, a mode selection part for selecting mode responding to output signal of said motor drive part, in such a manner that, as mode I when said back lid is not completely closed or said film magazine is not filled in said still camera, by receiving output signal from said state detection part, to make said motor drive part to stop the rotation of said motor in a predetermined short time, as mode II when said count pulse signal is not issued from said count pulse generator during wind-up of said film, to issue a rewind signal and as mode III when count pulse signal from said count pulse generator ceases during a rewinding of said film, to make the motor drive part to stop the rewinding motion of said motor, and a film transfer direction circuit for issuing a motor rotation reversing signal to said motor drive part when said mode II is selected.

* * * * *